Dec. 14, 1965    D. ALBERT    3,223,457
PNEUMATIC FLUIDIZING MEANS
Filed Jan. 29, 1964
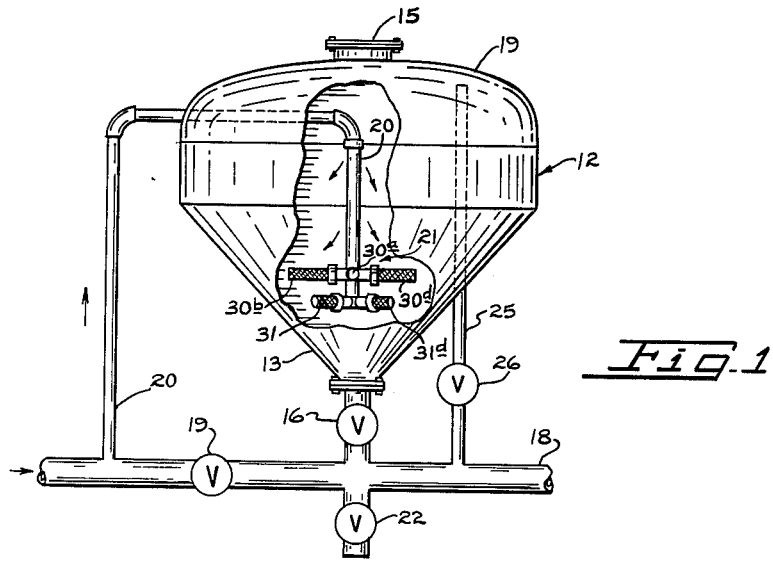
Fig. 1
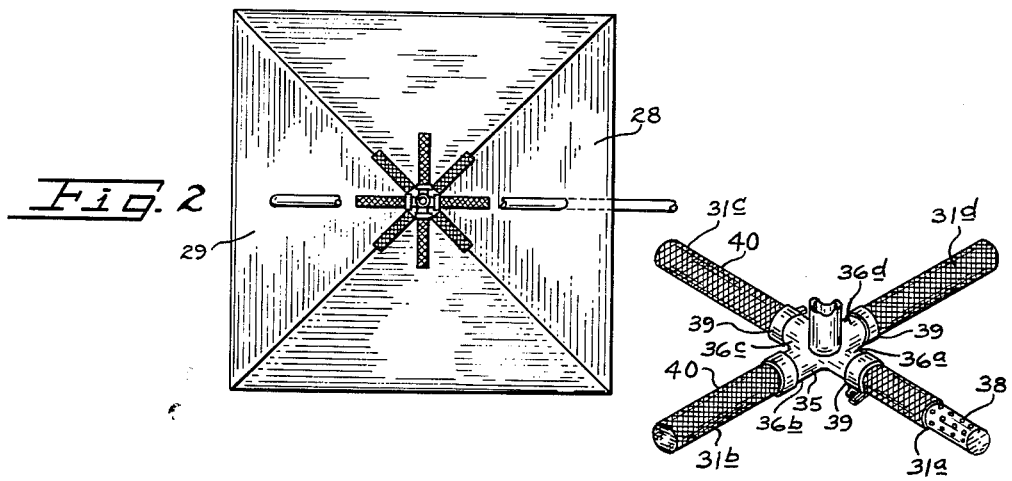
Fig. 2
Fig. 4
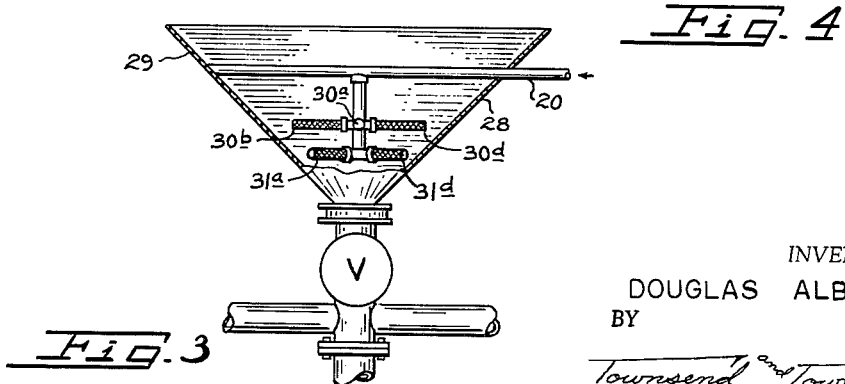
Fig. 3
INVENTOR.
DOUGLAS ALBERT
BY
Townsend and Townsend
ATTORNEYS United States Patent Office 3,223,457
Patented Dec. 14, 1965

3,223,457
PNEUMATIC FLUIDIZING MEANS
Douglas Albert, Oakland, Calif., assignor to Albert Air Conveyor Corp., Oakland, Calif., a corporation of Nevada
Filed Jan. 29, 1964, Ser. No. 340,925
5 Claims. (Cl. 302—53)

This invention relates to an improved apparatus for aiding the removal of pulverant material from a storage vessel. More particularly this invention relates to an improved pneumatic fluidizing apparatus which is used to aid the discharge of pulverant materials from the storage tank.

The pneumatic removal of pulverant materials, such as gravel, salt, and flour from a hopper can be accomplished by aerating or fluidizing the lowermost portion of the material located in the vicinity of the hopper outlet with pressurized air. By directing the pressurized air into this mass of pulverant material, the flowability of the material is increased and any tendency for the materials to compact and block the hopper outlet or to remain trapped on the hopper walls is substantially reduced.

Heretofore, fluidizing or aerating has been accomplished by means of fluid pervious pads connected as an integral part of the hopper walls. Normally, these fluid pervious pads included a skin or membrane of rubber-like material which let air into the chamber to aerate or fluidize the pulverant material when a pressure differential existed across the membrane. As a result of the fluidization, the flowability of the pulverant material discharge through a hopper outlet opening was increased. Although this type of pad was well suited for finer materials it was not especially efficient when coarse, pebbly, or gravelly type pulverant materials were handled. In this latter situation there was a tendency for the fluidizing air to flow past the material at times when the pad started to become uncovered. As a result, the material could remain on the hopper walls or become compacted and bridge over the outlet opening. In addition, the pad by necessity of its design and characteristics formed an irregular area on the normally smooth hopper wall surface thereby creating a material trapping area. When material was so trapped on such areas or in the hopper, it was possible for a customer to receive a short load for which he was charged. In addition residual material could cause contamination problems especially when a caustic material was carried on one load and edible food products were carried on subsequent loads. In such cases, residual material removal normally required an auxiliary cleaning operation such as flowing a sudden blast of pressurized air into the tank.

Accordingly, it is an object of this invention to solve the above problems by locating the fluidizing elements above and spaced from the hopper walls.

The advantage of this arrangement resides in the fact that the surface of the hopper walls is uninterrupted and smooth thereby substantially eliminating fluid trapping areas thereon.

An advantage of this arrangement resides in the fact that the fluidizing fluid can be directed in an efficient pattern which effectively cleans the hopper valleys or corners formed at the abutment or intersection of the flat walls of the hoppers.

Another object of this invention is to provide a suspended fluidizer of the above type in which the fluidizing elements are arranged in a radially extending spoke-like configuration extending from the axis of the pressure vessel toward the hopper walls and toward the hopper wall valleys or corners to direct the fluidizing air in a more effective pattern for clean-out of the flat sloping wall portions to the hopper and the hopper valleys.

Yet another object of this invention is to provide an improved fluidizing element for the above type of fluidizer which includes a perforated pipe having a jacket of woven fibers, which is pervious to the pressurized fluid and impervious to the pulverant material, snugly secured about the pipe in an easily detached arrangement to fluidize or aerate the pulverant material contained in the hopper when pressurized fluid is directed into the pipe.

An advantage resides in the fact that the jacket can be readily detached thereby permitting harsh solvents or chemicals to be used for cleaning the pressure vessel interior. Another advantage of easy jacket removal resides in the fact that one set of jackets can be removed and replaced with another set of jackets to eliminate contamination problems which might arise due to incompatible materials having previously become ingrained in the jacket fabric wherein a subsequent load would be deleteriously affected by the ingrained material.

Another advantage of easily detachable jackets is that the same set of jackets can be removed and stored for reuse when fluidizing the same material at some later time thereby eliminating the need for cleaning the fluidizing jackets or surface or any ingrained or adhered materials when incompatible materials are to be handled on subsequent loads.

Still another object of this invention is to provide a seamless woven fabric jacket which is connected about a fluid distributing pipe, the jacket being pervious to the pressurized fluid when a pressure differential exists across the fabric but which jacket is impervious to the pulverant material when the pressure within the pipe decreases.

Other objects, features, and advantages of this invention will become apparent upon reading the following detailed description and referring to the accompanying drawings in which:

FIGURE 1 is a side elevational view showing one embodiment of the fluidizing means connected in the hopper of a pressurized storage vessel;

FIGURE 2 is a side elevational view of a second embodiment of the fluidizing means connected in a hopper;

FIGURE 3 is a top plan view of the spoke-like fluidizing element arrangement of FIGURE 2; and FIGURE 4 is an enlarged perspective view of the lower fluidizing elements in which a portion of one woven fiber jacket is broken away to show the enclosed perforated fluid distributing pipe.

An illustrated in FIGURE 1, there is provided a representative pressurized storage vessel 12 having a hopper floor 13 and a dome-like lid 14. A sealable access door 15 is provided in the lid for depositing pulverant material such as gravel, stones, sand, salt, or flour within the vessel chamber. Once vessel 12 is filled access door 15 is sealed in an airtight fit. It should be noted at this time that the vertical or upright vessel 12 is meant to be representative of the various types of pressurized storage vessels which can be used. Hopper 13 has sloping side walls which tend to gravitationally feed the pulverant material toward outlet valve 16. With outlet valve 16 closed the storage vessel is effectively a sealed closed storage chamber.

During the fluidizing operation outlet valve 16 is opened to provide a path for pulverant material transfer from the storage vessel interior to the connected horizontal material discharge pipe 18. By opening discharge control valve 19, a pressurized stream of air is directed through discharge pipe 18 to carry away any pulverant material which drops through outlet valve 16. Of course, it should be understood that an alternate material removal arrangement could be used such as a gravity discharge valve 22 connected directly below the vessel outlet valve 16. In such cases, the outlet portion of the main material discharge conduit or pipe 18 would not be necessary. A portion of pressurized air branches into fluidizing supply line 20 and is directed through the vessel storage chamber along the chamber axis and into the fluidizer 21 suspended within the hopper from the lower end of air supply pipe 20. While pulverant material is falling free of the hopper the pressurized fluid supplied to the fluidizing elements 30a, 30d and 31a–31d is directed into the pulverant material to fluidize or aerate it thereby making it more flowable and insuring ready material removal through the hopper outlet without the attendant problems of the pulverant material compacting and bridging across the outlet and preventing further removal of material.

In order to equalize the pressure in the air space at the top of pressurized storage chamber 12 it may be necessary to provide a vent means 25 having a valve 26 connected therein for effectively opening and closing a path for venting fluid communication with main material discharge pipe 18.

Now referring to fluidizer 21, it is seen that the fluidizing elements or arms 30*a* through 30*d* and 31*a* through 31*d* are suspended within the lower portion of the hopper and spaced above the hopper walls. As pressurized fluid is directed through the fluid supply pipe 20 the fluid branches into these arms and escapes or is directed through the fluid pervious jackets and fluidizes or aerates the pulverant material contained within the hopper, as will be explained in more detail shortly.

Before describing the details of the fluidizer elements, reference is first made to the second embodiment of the invention illustrated in FIGURES 2 and 3. Here pressurized fluid supply pipe 20 is connected horizontally between two of the sloping hopper walls by welding or any other suitable leak-proof method. One end of air supply pipe 20 is blocked or sealed by the hopper wall 28 and the other end of the supply pipe extends through an aperture in hopper wall 29 to a supply of fluid. Pressurized fluid can be supplied to pipe 20 in much the same manner as described in reference to the embodiment of FIGURE 1. As more clearly illustrated in the top plan view of FIGURE 3 the hopper walls form an inverted pyramid with valley, or corners, being formed at the abutment of each triangular wall portion. As previously stated, these valleys have a tendency to retain the pulverant material during the discharge operation or emptying of the hopper. And as previously stated in describing the prior problems it can be seen that a fluidizing pad forming part of a hopper wall will not provide a fluidizing air pattern which will effectively fluidize material retained in these valleys.

In order to overcome these problems, the fludizing elements of this invention can be arranged spaced from and above the hopper walls in upper and lower sets. Those arms or elements 31*a* through 31*d* in the lower set are radially directed from vertical fluid supply hub or cross fitting 36 toward the valleys. By so directing this lower set of arms 31*a* through 31*d* into the hopper corners it is possible to take advantage of the increased linear dimension which occurs between diametrically opposite valleys. As a result, a relatively long fluidizing element can be employed thereby greatly increasing the fluidizing efficiency of the system. The upper set of fluidizing elements or arms 30*a* through 30*d* project radially from the vertical fluid supply hub 36 at an angular displacement relative to the lower set of radially projecting fluidizing elements. Because of the sloping nature of the hopper walls and the resultant increase in radial dimension it is possible to direct the upper set of fluidizing elements or arms directly toward the flat hopper walls. As a result it is possible to provide fluidizing elements which are the same length as the lower set of fluidizing elements and in which each set effectively fluidizes material at different portions of the hopper.

Now referring to the details of the fluidizer structure illustrated in FIGURE 4, the side-inlet, cross fitting 35, is representative and has been illustrated broken away from the upper side inlet cross fitting. Each cross arm projects at a right angle to the adjacent arms and is threaded at the end for threaded connection with individual ones of four perforated pipes 38. Each perforated pipe 38 is capped or plugged at its outermost end and provides distributing paths through the perforations for pressurized fluid. The material used for fitting 35 and the perforated pipes 38 should be of any conventional pipe material which is capable of withstanding the internal pressures of the pressurized fluid and supporting the weight of the pulverant material dumped into the hopper.

In order to insure a relatively even distribution of the pressurized fluid during the fluidizing operation and to prevent entry of the pulverant material into the pipes by way of the pipe perforations a woven fiber jacket 40 is snugly slipped over each perforated pipe 38 and secured thereto by means of a quick coupling fastener 39. One type of fastener which could be used would be the trademarked Kamlock fastener which has two depressible members connected for fastening or releasing the sleeve flange. The woven jacket 40 is preferably seamless and must be pervious to the pressurized fluid within the pipes 38 when a sufficient pressure differential exists across the jacket material but impervious to the pulverant material when the fluid pressure within perforated pipe 38 is reduced. The particular fibers used in the woven material can include asbestos, canvas, natural fibers, synthetic fibers or any combination. A combination of asbestos and canvas has been found to be especially effective.

As previously stated, the advantage of a quick disconnect and woven fiber jacket resides in the fact that jackets 40 can be disconnected when they become ingrained or contaminated with the residue of pulverant material and a clean one substituted. In addition, different sets of jackets can be always kept on hand which are always used on the same pulverant material, i.e., one set would always be used on caustic materials and another set would be used on flour. The normally fluid absorbent fiber jackets can also be removed at such time as the vessel interior is to be cleaned with solvents or detergents. This removal greatly simplifies the cleaning operation and eliminates the expense of replacing jackets which can be operationally destroyed by the cleaning materials.

Although several embodiments of this invention have been described and illustrated in detail for purposes of description it should be understood that other changes can be made in the invention without departing from the scope thereof as defined in the appended claims.

What is claimed is:

1. An improved apparatus for handling pulverant material comprising: a hollow tank including a hopper having a sloping wall secured to the bottom thereof; outlet means connected to the lowermost portion of the hopper for discharging pulverant material from said tank; a substantially vertically extending gaseous fluid supply means connected to direct pressurized gaseous fluid into said tank; and a plurality of hollow fluid distributor means having terminal ends spaced apart from and above said sloping wall, each said terminal end having a wall portion including fabric of the type which is pervious to pressurized fluid and impervious to pulverant material, means for removably mounting said fabric to said fuel distributor means, said distributors being connected to project in radially spaced apart relation from the fluid supply means to fluidize the pulverant material with the pressurized fluid for subsequent discharge of the fluidized material through said outlet means.

2. The improved apparatus for handling pulverant material of claim 1 in which said hollow fluid distributors each project horizontally from the fluid supply means in a zone within the hopper and above the outlet means.

3. The improved apparatus for handling pulverant material of claim 2 in which some of said plurality of fluid distributors are connected to radiate from the fluid supply means at a first vertical level and the remaining fluid distributors are connected to radiate from said fluid supply means at a second vertical level and in which the distributors of one level are angularly displaced from the distributors on the other level.

4. An improved apparatus for handling pulverant material comprising: a pressure vessel having a hopper floor secured thereto; said vessel being operable to store pulverant material; outlet means connected to discharge the pulverant material from said vessel at the lowermost portion of said hopper; fluid supply means connected to direct pressurized fluid into said vessel along the central vertical axis thereof; a plurality of distributor pipes connected in fluid communication with said fluid supply means above and spaced from the hopper wall to direct the pressurized fluid in a zone within the hopper; each said pipe being perforated along a portion of its length remote from said fluid supply means to permit release of pressurized fluid therethrough; a jacket of woven fiber which is pervious to the pressurized fluid and impervious to the pulverant material disposed around each said perforated pipe portion to fluidize the pulverant material in the hopper zone; and means for removably connecting said jacket to said pipe.

5. The improved apparatus for handling pulverant material of claim 4 in which the hopper has flat walls and forms an inverted pyramid and said plurality of fluid distributor pipes are the same length and are arranged in an upper and a lower horizontally extending zone and in which the individual pipes in the lower zone project toward each of the pyramid corners and in which the individual pipes of the upper zone are angularly displaced relative to the lower pipes to project toward the hopper wall.

References Cited by the Examiner

UNITED STATES PATENTS

| | | | |
|---|---|---|---|
| 2,815,987 | 12/1957 | Sylvest | 302—29 |
| 2,924,489 | 2/1960 | Beckman | 302—53 |
| 2,989,349 | 6/1961 | Hartley | 302—53 |
| 3,121,593 | 2/1964 | McIlvaine | 302—53 |

FOREIGN PATENTS

| | | |
|---|---|---|
| 1,145,549 | 3/1963 | Germany. |
| 607,009 | 8/1948 | Great Britain. |

SAMUEL F. COLEMAN, *Primary Examiner.*